United States Patent [19]

Albers et al.

[11] Patent Number: 4,656,589

[45] Date of Patent: Apr. 7, 1987

[54] METHOD AND APPARATUS FOR OPERATING TURBO COMPRESSOR USING ANALOG AND DIGITAL CONTROL SCHEMES

[75] Inventors: Rolf Albers; Wilfried Blotenberg, both of Oberhausen, Fed. Rep. of Germany

[73] Assignee: M.A.N.Maschinenfabrik Augsburg-Nürnberg, Fed. Rep. of Germany

[21] Appl. No.: 682,930

[22] Filed: Dec. 18, 1984

Related U.S. Application Data

[63] Continuation-in-part of Ser. No. 347,337, Feb. 9, 1982, abandoned.

[30] Foreign Application Priority Data

Feb. 14, 1981 [DE] Fed. Rep. of Germany ....... 3105376

[51] Int. Cl.[4] .................... F04D 27/02; G05B 13/02; G05D 16/20
[52] U.S. Cl. .................................. 364/431.02; 415/1; 415/17
[58] Field of Search ................. 364/431.02; 415/1, 11, 415/17

[56] References Cited

U.S. PATENT DOCUMENTS

| | | | |
|---|---|---|---|
| 4,046,490 | 9/1977 | Rutshtein et al. | 415/11 X |
| 4,139,328 | 2/1979 | Kuper et al. | 415/1 |
| 4,156,578 | 2/1979 | Agar et al. | 415/1 |
| 4,164,033 | 8/1979 | Glennon et al. | 415/17 X |
| 4,196,472 | 4/1980 | Ludwig et al. | 364/431.02 |
| 4,203,701 | 5/1980 | Abbey | 415/1 |
| 4,298,310 | 11/1981 | Blotenberg | 415/1 |
| 4,355,948 | 10/1982 | Kountz et al. | 415/1 |
| 4,384,818 | 5/1983 | Blotenberg | 415/1 |
| 4,464,720 | 8/1984 | Agarwal | 364/431.02 |
| 4,560,319 | 12/1985 | Blotenberg | 415/1 |

Primary Examiner—Felix D. Gruber
Attorney, Agent, or Firm—McGlew and Tuttle

[57] ABSTRACT

A method and arrangement for controlling the operation of turbo compressors, particularly those of high capacity, utilizes flow rate and pressure values for an analog controller as well as a computing circuit to optimize the operation of the compressor. The compressor is assumed to have a characteristic basic linear blowoff line and an optimum non-linear blowoff line on its pressure/flow curve. The calculating or computing circuit computes an error signal representing a difference between the basic and optimum blowoff line at an operating pressure and applies the signal to the analog controller which controls the compressor to its optimum extent. An analog system connected to the controller maintains control at least according to the basic blowoff line if the computing circuit fails.

12 Claims, 2 Drawing Figures

FIG. I

METHOD AND APPARATUS FOR OPERATING TURBO COMPRESSOR USING ANALOG AND DIGITAL CONTROL SCHEMES

CROSS REFERENCE TO RELATED APPLICATION

This is continuation-in-part of the inventors' previous application Ser. No. 347,337 filed Feb. 9, 1982 under the title METHOD OF OPERATING TURBO COMPRESSORS and now abandoned.

FIELD AND BACKGROUND OF THE INVENTION

The present invention relates in general to the control of turbo compressors and in particular to a new and useful apparatus and method of operating turbo compressors, particularly those of large capacity, comprising continuously measuring the rate of flow of the compressor, or a signal derived therefrom, and the discharge pressure or a pressure ratio of the compressor. The measured values are compared with permissible values therefor. In order to prevent surging, for example, before the reaching of a surge limit, it is insured that the rate of flow of the compressor does not fall below a minimum value which depends on the discharge pressure. This is accomplished through a closed loop control with analog and digital components, which operates to open one or more blowoff valves upon the attainment of a blowoff line which extends parallel to the surge limit on a pressure/flow characteristic curve of the compressor.

Surge limit controls which employ mechanicalhydraulic controllers are known. In spite of this very expensive equipment, however, with such prior art controls, the surge limit cannot be reproduced closely enough to reliably prevent surging. Another disadvantage of these hydraulic controls are their high maintenance and a considerable susceptibility to disturbances.

Further known is an electronic control for the surge limit, such as disclosed in the German publication "Mitteilung 542 der Warmestelle des Vereins deutscher Eisenhuttenleute" (communication 542 of The Heat Division of the Association of ferman Metallurgists). According to the disclosure, the surge limit control in a compressor with variable guide vane is similar to that designed for compressors with an adjustable throttle, with the difference, however, that a function generator is provided for forming the reference input of the surge limit controller, because of the non-linear curve of the surge limit.

It is a disadvantage in these prior art controls that at certain operating conditions, for example upon a manual intervention in the control or under strong pressure variations, surges in the compressor cannot be prevented with satisfactory reliability.

From German OS No. 26 23 899, an electronic control of the surge limit is known in which the output signal, depending on the actual values of pressure and flow, of the surge limit controller operating to adjust the blowoff valve, is amplified non-linearly, namely the amplification is augments if the error signal value is negative, i.e. if the operating pressure of the compressor passes into an extreme region, beyond the blowoff characteristic line. Further, in that disclosure, an extreme value selector connected ahead of the controller is responsive to the maximum error signal value, namely to the error signal value proper, or to the difference between the controller output and the manually set control signal.

This very satisfactorily operating control has the disadvantage, however, that it cannot follow the variation rate of the actual value, or evaluate whether the error signal value increases or decreases. In practice, this means that the blowoff line remains adjusted to a constant value, independently of the operating conditions.

A control method is also known, in which the position of the blowoff line within the characteristic is made dependent on the rate at which the working point moves through the performance graph.

It is a disadvantage in such and similar circuits, however, that the circuit elements operating in a purely analogous way become very expensive if various additional parameters, for example, the temperature, pressure, humidity at the suction side, or the molecular weight, are to be taken into account, or if the blowoff characteristic line is of a shape which is difficult to produce.

Brochures which have been distributed by the assigness of the present application disclose an analog system which measures flow rate through an output pressure from a compressor to produce a signal which is applied to a PI controller to control the position of a blowoff valve (Turbolog-Electronic Control System for GHH Turbomachinery from "*Machinery News* 3" published by M.A.N. Division GHH Sterkrade Oberhausen.

Such an analog control has the advantage of responding quickly to changes in flow and pressure but has the disadvantage of following a blowoff line which is at substantial distance from an optimum surge limit. This distance must be maintained since the factors noted above, such as temperature, humidity and molecular weight, are not taken into account.

Also see U.S. Pat. Nos. 4,298,310 and 4,384,818, both to Blotenberg, which disclose analog systems for controlling a blowoff valve of a turbo compressor. These two patents are incorporated by reference here.

A relationship is known which relates the socalled adiabatic head of a compressor to inlet and outlet pressure as well as variable such as inlet temperature, molecular weight and humidity. The adiabatic head is a more exact measurement of the compressor performance than outlet pressure which is generally used for convenience and as an approximation of adiabatic head.

While adiabatic head cannot be measured directly, it can be calculated using the relationship:

$$\Delta h_{ad} = \frac{K}{K-1} RT_1 \left[ \left( \frac{P_2}{P_1} \right)^{\frac{K-1}{K}} - 1 \right] \tag{1}$$

where:
$\Delta h_{ad}$ = adiabatic head
K = adiabatic index
R = gas constant
$T_1$ = inlet temperature
$P_1$ = inlet pressure
$P_2$ = outlet pressure.

This relationship is known from E. Truckenbrodt: Strömungsmechanik Springer Verlag Berlin Heidelberg New York 1969, page 54.

It is known that the adiabatic index is a function of molecular weight, humidity and the like. See U.S. Pat.

No. 4,156,578 to Agar et al which is incorporated here by reference.

It is also generally known to utilize digital computers or microporcessors for some control functions in plants, including plants that might use a turbo compressor. Such microprocessors or computers which are available from U.S. manufacturers are the Honeywell TDC 2000; the Micon P200; the Foxboro Microspec/Spectrum, the Fisher Controls Provox and many others. Computers available from manufacturers outside the United States include the Siemens Teleperm M; the Hartmann & Braun Contronic 3; the Kent P4000 and the Yokogawa Centum.

As known in the art, these digital computers can perform various calculations. This would include the calculation identified above for calculating adiabatic head. A drawback of such computers, however, is that they have a finite cycle time. In other words, a computation must be made on the basis of measurements taken at a certain point in time. Since it takes a certain amount of time to perform the calculations and generate a signal which could be used for control, the variable may change during this interim. It is generally known that this cycle time for above mentioned systems can be about 0.2 to 0.5 seconds. This delay is not acceptable for turbo compressors anti-surge control which can be damaged if operated beyong the surge limit even for vey short periods of time.

Another problem associated with the use of digital computers or microprocessors as a control mechanism is their relatively high failure rate which is a function of their complexity.

SUMMARY OF THE INVENTION

The present invention is directed to an apparatus for and a method of operating turbo compressors which eliminates the mentioned drawbacks and ensures, with a minimum of expense, that any parameter can be taken into account and even data representing blowoff lines which are difficult to reproduce can be determined by the controller exactly.

Accordingly, an object of the invention is to provide a method of operating turbo compressors, particularly those of large capacity, wherein the compressor rate of flow and the discharge pressure (or compression ratio) of the compressor are continuously measured and compared with permissible values therefor, and wherein, in order to prevent surging, for example prior to the reaching of a surge limit, it is ensured that the rate of flow of the compressor does not fall below a minimum value which depends on the discharge pressure using a closed loop controller which operates to open blowoff valves upon receiving data or a value representing the attainment of a blowoff line that is parallel to the surge limit. According to the invention an analog controller of simple design which is responsive to a value representing a basic linear blowoff line of the pressureflow characteristic curve of the compressor which is below an optimum blowoff line therefor, adjusts the blowoff valve, and, by means of an error signal produced in a separate digital computing circuit which is superimposed on the basic control, an optimized compressor operation is obtained.

If the suction pressure $P_1$ is constant, only discharge pressure $P_2$ is measured. If $P_1$ is variable, the set-point for the surge line is taken from $P_2/P_1$ rather than by $P_2$.

A further object of the invention is to provide a device for controlling the operation of a turbo compressor which comprises first means for continuously measuring a flow rate of the compressor, second means for measuring one of a discharge pressure or a compression ratio of the compressor, and analog controller systems for controlling the compressor, which is responsive to a value representing a basic linear blowoff line on a pressure-flow curve of the compressor, the basic blowoff line being below an optimum blowoff line on the curve, and a computing circuit connected to the analog controller for computing an error signal representing a difference between data representing the basic and optimum blowoff lines in an operating pressure or pressure ratio, the computing circuit operable to apply the error signal to the analog controller to control the compressor to an optimum extent at the operating pressure or pressure ratio.

A further object of the invention is to provide such a device which is simple in design, rugged in construction and economical to manufacture.

By superimposing the error signal on the basic control signal from the analog control system, if a fault occurs in the computing circuit, the error signal falls to zero and the turbo compressor is controlled according to the basic blowoff line. In this way, satisfactory control is maintained even if the computing circuit fails. Also, it is important to note since the analog control system operates instantaneously, the invention follows even fast changing conditions which cannot normally be followed by the computing circuit alone.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following, one embodiment of the invention is explained in more detail with reference to the drawings in which.

DESCRIPTION OF THE PREFERRED EMBODIMENT

Figure 2:
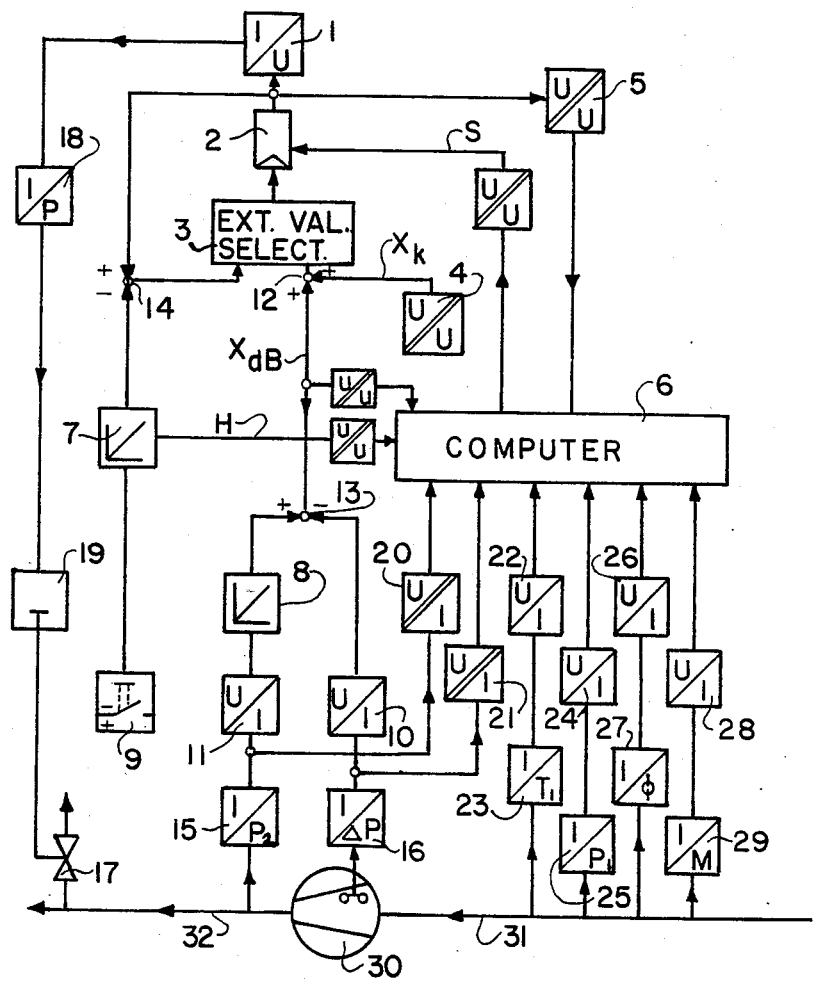
FIG. 2 is a schematic representation of a system for carrying out the inventive method.

Referring to the drawings, in particular, the invention embodied therein, in FIG. 2 comprises a basic or analog control system including transducers 10 and 11, a function generator 8, an extreme-value selector 3, a controller 2, a transducer 1, a manually controlled integrator 7 with a keyboard 9, and digital computing means in the form of a computer 6 with galvanic islolating transducers 4, 5, 20 and 21 and the additional ones shown.

All parameters required for adjusting the blowoff characteristic line in an optimum way to the surge limit (such as suction temperature correction $T_1$, parameters for flow calculation to be taken into account, humidity $\phi$, molecular weight M, suction pressure $P_1$, as well as other interesting factors) are fed into computing circuit 6 in the form of data representing these parameters.

Figure 1:
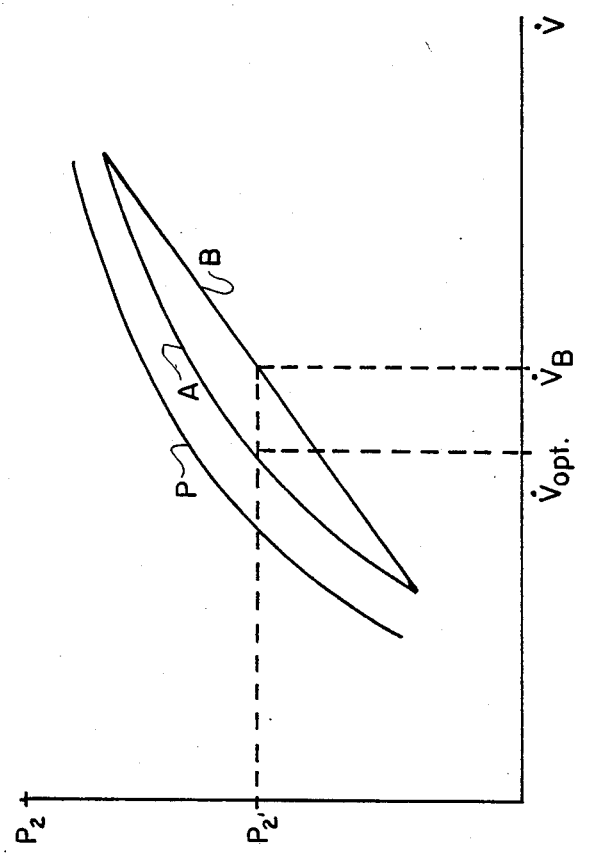
FIG. 1 is a pressure-flow diagram showing the surge limit line P, the optimum blowoff line characteristic line A, and the basic blowoff characteristic line B.

As shown in FIG. 1, the optimum blowoff line at A is close to and parallel with the surge line P, representing the actual point at which surge will occur. The ordinate of the graph of FIG. 1 showing output pressure $P_2$ for compressor 30 on its output line 32 (FIG. 2) actually represents adiabatic head $\Delta H_{ab}$. Optimum blowoff line A is always slightly to the right of the actual surge line P for every operating point $P_2'$, to maintain a safety factor of for example 70% for variables or conditions which cannot be met by the equation for calculating adiabatic head equation (1) set forth above. FIG. 1 also shows the linear basic blowoff line B which must maintain an even greater safety margin from surge line P. This additional margin must be maintained since the basic blowoff line B does not take variables such as inlet temperature, humidity and molecular weight into account.

As shown in FIG. 2, the various parameters which are used to calculate adiabatic head according to equation (1) can be measured for example from inlet line 31 for compressor 30. Transmitters 23, 25, 27 and 29, each of known design, can generate current signals which are proportional to the input temperature $T_1$, the input pressure $P_1$, the humidity $\phi$ and molecular weight M for the gas entering compressor 30. The current signals which are used to transmit information over relatively long distances, are supplied to transducers 22, 24, 26 and 28 respectively which convert the currents to appropriate voltages which are applied as voltage levels (data) to computer or computing circuit 6. As will be explained later, computer circuit 6 also receives additional signals (data) for completing the calculation and generating an appropriate error signal.

In the computing circuit 6, values or data representing the position of the blowoff line (B in FIG. 1) in the basic control is compared with values or data representing the optimum blowoff line (A in FIG. 1) as computed in the computing circuit, and the resulting error signal value $X_k$ is superimposed on the signal from the basic control system (8, 10, 11) at adder 12 and over transducer 4, so that the output of basic controller 2 pilots the machine to the optimum working point by blowoff valve 17 which is controlled by transducer 1, sending unit 18 and actuator 19 (which are all of known design). This comparison step will be explained in greater detail.

Upon failure or other trouble in the computing circuit 6, this circuit switches off, error signal value $X_k$ becomes zero, and the machine is further operated, on the safe side, with the basic control system alone. The separation also increases the safety and availability in instances where the output signal of the computing circuit is checked for reasonability or probability.

Computers of the type mentioned above which are all suitable as computing circuit or computer 6, are also known to be have self diagnostic circuits which can detect a fault. This can be used to artificially produce a zero signal for the error signal $X_k$ which is supplied through isolating transducer 4 to adder 12.

The operation will now be explained in connection with FIG. 1. A delivery pressure $P_2'$ corresponds to a volumetric flow $\dot{V}_B$ on the blowoff line B of the basic control. Through basic controller 2, the blowoff valve 17 is adjusted to obtain an actual flow rate $\dot{V}_{ist}$ which is equal or larger than the desired flow $\dot{V}_B$. $\dot{V}_{ist}$ is the measured volumetric flow, measured in the compressor inlet or discharge. The error signal value represented by:

$$X_{dB} = \dot{V}_B - \dot{V}_{ist}$$

is zero, when the operating point is on the blowoff line and the controller is in operation.

Computing circuit 6 computes the optimum required flow rate $V_{opt}$ and forms therefrom the error signal valve:

$$X_k = \dot{V}_{opt} - \dot{V}_{ist} - X_{dB} \tag{3}$$

This value is added to error signal valve $X_{db}$ by adder 12, so that basic controller 2 continues to adjust the blowoff valve until the input of the controler becomes zero, i.e. until $\dot{V}_{ist} = \dot{V}_{opt}$.

In another variant of the method, the basic blowoff characteristic line B is stored (as data) in the computing circuit 6. Then, the transfer of $X_{dB}$ to the basic control is omitted, since this value can be formed within the computing circuit.

It is noted that where data corresponding to the basic line B is not stored in the computing circuit 6, they can easily be calculated using the isolating transducers 20 and 21. Transducers 20 and 21 are connected to transmitters 15 and 16. Transmitter 15 is connected to the outlet line 31 and produces a current proportional to the output pressure $P_2$. Transmitter 16 is connected to spaced apart pressure sensors in the compressor 30 and yield a pressure difference value which can be used as a flow rate value for a flow of gas through the compressor 30. These currents are changed to voltages in transducers 20 and 21 and provided as data to computer 6. It is noted that the same transmitters 15 and 16 are provided to the transducers 11 and 10 respectively of the analog control system. It is noted that function generator 8 connected to the output of transducer 11 generates the basic blowoff line B data from the voltage signal it receives which signal is proportional to the outlet pressure of the compressor 30. Additional details on this analog control can be found in U.S. Pat. No. 4,384,818 to Blotenberg, which was identified above. It is noted that rather than following the output pressure $P_2$, the compression ratio for compressor 30 can easily be obtained since the input pressure $P_1$ can either be sensed in a known way or held constant, in which case the output pressure $P_2$ corresponds to the compression ratio.

The signal from function generator 8 and from flow rate transducer 10 are subtracted in comparator 13 to generate the analog control error $X_{dB}$ which is supplied to adder 12. If the two signals supplied to comparator 13 are equal, this means that the control error $X_{dB}$ is zero and no change is necessary for the blowoff valve 17. If the control error is negative, indicating a greater flow rate than necessary, controller 2 is operated to close down blowoff valve 17 at a rate which is determined by the controller 2 according to the size of the control signal. If a control signal is positive indicating too low a flow rate controller 2 controls valve 17 towards open position.

The more refined optimum error signal $X_k$ modifies the control error $X_{dB}$ in adder 12. The combined signal is supplied to an extreme value selector 3 which also is of known design and is disclosed in the Blotenberg Pat. No. 4,384,818.

Extreme value selector 3 also receives a signal from a comparator 14 which responds to a manually impressed signal. Extreme value selector 3 will select the highest value to impress on controller 2. Comparator 14 receives a signal from manually controlled integrator 7 which can output a value from zero to 100 percent depending on a manipulation of manual switch or switches 9. The manufally impressed signal is compared with the actual position of controller output 2, in comparator 14, and if the two values are not equal a control error is applied to the extreme value selector 3.

In order to perform the calculation of the equation (3), computer 6 receives a signal from the output of comparator 13 which corresponds to the basic control error $X_{dB}$.

In this blowoff control for turbo compressors, the values of a number of mathematical functions are to be produced, trends are to be analyzed, and non-linear characteristics are to be stored.

This may be done with digital microprocessors or computers as noted above.

Since such systems are not yet reliable to an extent required for the operation of industrial turbo compressors, the invention uses them in conjunction with the reliable analog system.

Therefore, a combined blowoff control may be considered. All of the complicated computing is performed by a digital microprocessor 6, such as the basic controller 2, and elements 10, 11 furnish the needed reliability of control.

The basic controller 2 is simple in design and is known. The desired value is formed from the delivery pressure as measured by transducer 11. The blowoff line is represented by the straight line B in FIG. 1. A correction of the actual value of variables of the volumetric flow may frequently be omitted, which also goes for the influence of the temperature at the suction side. The blowoff line is set to insure a satisfactory protection of the machine at all working points and under any operating conditions. This frequently leads to the result that the machine is operated with an unnecessarily large margin between the surge limit and the blowoff line.

The prior art manual control of the blowoff valves is also analog in design.

Now, if a microporcessor fails, error signal value $X_k$ becomes zero and the working point adjusts to $V_{ist} = V_B$. This is because selector 3 then receives only the $X_{dB}$ signal from adder 12.

This circuit has the advantage of employing a single controller, namely the basic controller 2 which is permanently engaged. Any switching and build-up problems are thereby eliminated.

Should the microprocessor 6 be intended for more complex algorithms the evaluation of which would interfere with the operation of an analog PI controller, a somewhat modified structure is possible, wherein, with the microprocessor switched on, the integrating part in the basic controller 2 is switched off by a signal on line S. Then, the controller 2 operates only as a proportional amplifier. The microprocessor compares the output of the analog basic controller over transducer 5 with the output of the digital computer (internal to circuit 6) and adjusts the error signal value $X_k$ to obtain identical controller outputs.

The circuit of the microprocessor 6 may include elements responsive to the inverted behavior in time of the controller, in which case there is no need for modifying the structure of the controller.

Upon taking a manual control action, the microprocessor 6 must be switched off. This instruction may either be recalled from the manually controlled integrator 7 on line H or derived from a comparison between the input and output of the extreme value selector 3.

An equilibrating circuit in the computing circuit 6 provides for an elimination of jumps upon a manual control action, and upon switching on of the computing circuit.

The layout of the circuit for carrying out the invention is shown in FIG. 2. Therefrom, a person skilled in the art may derive obvious modifications. While considering the labelled blocks, the operation of the circuit is a matter of course for a person with expertise in the field. For quick reference, the various elements and values of the invention are listed as follows:

voltage-current transducer 1;
controller 2;
extreme-value selector 3;
isolator 4;
isolator 5;
computing circuit 6;
manually controlled integrator 7;
function generator 8;
keyboard 9;
current-voltage transducer for measuring the rate of flow (at the suction side) 10;
current-voltage transducer for measuring the pressure (downstream of compressor) 11;
manual control imput to computing circuit;
error signal value $X_k$;
structure switching of the controller S;
surge limit P;
optimum blowoff line A; and
basic blowoff line B.

The error signal value $X_k$ may be superposed on either the desired value (the control error $X_{dB}$) or on the actual value (while taking into account the sign), it may be advantageous in many instances of application to provide a penumatically hydraulically operated basic control, instead of an electronic analog control. Since the basic control is linear, thus follows a straight line, the mechanical, i.e. pneumatic or hydraulic basic control can be designed simply and properly. What is important is to keep to the inventive solution, namely the separation into a basic and a corrective control, to obtain a control which is improved and still safely prevents surging upon a failure or disturbance in the system.

The inventive circuit is also capable of making a reliable correction of the computed surge limit.

If a surge occurs, the operational data at that point are collected and stored. The corresponding point on the blowoff line is determined from the delivery pressure. The corresponding rate of flow at the surge limit is determined from the set safety margin between the surge limit and the blowoff line. If the computed and the measured rates of flow differ from each other, the blowoff line is readjusted by this difference. In advance, the measured values of the surge point may be checked for reasonableness. For example, a correction may be omitted upon the occurrence of certain disturbances which are very rare in normal operation. Further, the circuit may be designed to make a correction only if a plurality of surges of equal tendency occur.

While a specific embodiment of the invention has been shown and described in detail to illustrate the application of the principles of the invention, it will be understood that the invention may be embodied otherwise without departing from such principles.

What is claimed is:

1. A method of operating a turbo compressor, particularly one of large capacity, which compressor has a characteristic pressure-flow curve with a basic linear blowoff line (B) which is below an optimum blowoff line (A), and using an analog control system (10. 11, 13) responsive to the values representing the basic linear blowoff line, calculation means (6) responsive to values representing the optimum blowoff line, and an analog controller (2) for controlling at least one blowoff valve (17), comprising:

continuously measuring a rate of flow through the compressor and one of a discharge pressure and compression ratio of the compressor;

comparing values obtained by said continuous measuring with permissible values of the flow rate and one of the discharge pressure and compression ratio to generate a basic error signal value ($X_{db}$) for the controller;

generating values representing the optimum blowoff line using the calculator means;

generating an optimum error signal ($X_k$) using the calculator means which represent a difference between the basic and optimum blowoff line values at an operating pressure for the compressor;

superimposing the optimum error signal on the basic error signal to generate a control signal for the analog controller; and reducing the optimum error signal to zero if a fault occurs in the calculator means whereby the analog control system applies the basic error signal even with failure of the calculator means.

2. A method according to claim 1, including calculating said optimum error signal using additional compressor parameters chosen from variations in flow rate, temperature, inlet pressure, dew point, and molecular weight of gas flowing through the compressor.

3. A method according to claim 1, including checking a reasonability of the optimum error signal and, where the optimum error signal is beyond selected limits, switching off a superposition of the optimum error signal on the basic error signal whereby the analog controller controls the compressor according to values representing the basic linear blowoff line.

4. A method according to claim 1, including monitoring variations in time in an operating point on the pressure-flow curve and, varying the control of the compressor by (through) the analog controller if the working point approaches a surge limit at a selected high rate.

5. A method according to claim 1, characterized in that upon the occurrence of a surge in the compressor, operational data upon said occurrence is stored and checked for reasonableness during the surge, and if a deviation from a theoretical surge limit occurs, correcting the surge limit and and the optimal blowoff line.

6. A method according to claim 1, comprising utilizing a microprocessor for calculating said optimum error signal.

7. A device for controlling the operation of a turbo compressor having a characteristic pressure-flow curve comprising:

first means for continuously measuring a flow rate of the compressor;

second means for measuring one of a discharge pressure and a compression ratio of the compressor;

an analog controller for controlling the compressor, being responsive to values representing a basic linear blowoff line on the pressure-volume curve, the basic blowoff line being below values representing an optimum blowoff line on the curve; and a computing circuit connected to said analog controller for computing an error signal representing a difference between values representing the basic and optimum blowoff lines at a working pressure and operable to apply the error signal to said analog controller to control the compressor to an optimum extent.

8. A device according to claim 7, wherein said computing circuit includes inputs for receiving additional compressor parameters for calculting said error signal, said parameters including variations in flow rate, temperature, inlet pressure, dew point and molecular weight of gas through the compressor.

9. A device according to claim 7, including an extreme value selector for checking the reasonableness of an error signal and, where an error signal is found to be unreasonable, disconnecting said computing circuit from said analog controller whereby said analog controller controls the compressor according to the values representing the basic linear blowoff line.

10. A device according to claim 7, including means in said computing circuit for changing said values representing the optimum blowoff line according to operation data stored during the occurrence of a surge, which operational data demonstrates a deviation from the optimum blowoff line before it is changed from a theoretical surge limit.

11. A device according to claim 7, wherein said computing circuit is a microprocessor.

12. A device according to claim 7, including monitoring means for monitoring variations in time of a working point on the pressure-flow curve and applying said variations to said analog controller.

* * * * *